United States Patent [19]

Smith et al.

[11] Patent Number: 5,241,631
[45] Date of Patent: Aug. 31, 1993

[54] PERSONAL COMPUTER HAVING A LOCAL BUS INTERFACE TO A VIDEO CIRCUIT

[75] Inventors: Arnold J. Smith, Lawrence; Martin G. Zartarian, Boxboro, both of Mass.; David J. Lyons, New Ipswich, N.H.

[73] Assignee: NEC Technologies, Inc., Boxborough, Mass.

[21] Appl. No.: 749,362

[22] Filed: Aug. 23, 1991

[51] Int. Cl.⁵ .............................................. G60F 13/00
[52] U.S. Cl. ................... 395/325; 364/DIG. 1; 364/237; 364/237.3; 364/240; 364/240.2; 364/231
[58] Field of Search ............ 364/240.2, 200 MS File, 364/900 MS File; 395/325

[56] References Cited

U.S. PATENT DOCUMENTS

| | | | |
|---|---|---|---|
| 4,516,199 | 5/1985 | Frieder et al. | 395/275 |
| 4,564,902 | 1/1986 | Leininger | 395/725 |
| 4,656,597 | 4/1987 | Bond et al. | 364/518 |
| 4,701,865 | 10/1987 | Goodman | 364/521 |
| 4,722,051 | 1/1988 | Chattcradhya | 395/425 |
| 4,837,682 | 6/1989 | Culler | 395/325 |
| 4,847,604 | 7/1989 | Doyle | 340/706 |
| 4,855,730 | 8/1989 | Venners et al. | 340/825.24 |
| 4,870,590 | 9/1989 | Kawata et al. | 364/468 |
| 4,967,375 | 10/1990 | Pelham et al. | 364/518 |
| 5,091,850 | 2/1992 | Culley | 395/400 |

*Primary Examiner*—Dale M. Shaw
*Assistant Examiner*—Lance L. Barry
*Attorney, Agent, or Firm*—Sughrue, Mion, Zinn, Macpeak & Seas

[57] ABSTRACT

A system architecture of a personal computer is modified to increase overall performance including the display of video signals while maintaining PC compatibility. A video control circuit is positioned onto a motherboard so that it directly interfaces with a local bus of a processing unit. The processing unit may include, for example, a 80386 microprocessor and a 82396 cache controller or simply a 80386 or 80486 microprocessor. As a result, the processing unit can directly read data from and write data to the video controller without always having to traverse the peripheral bus. Video data is thus transferred at the rate at which the processing unit operates and not at the slower rate of the peripheral bus.

28 Claims, 7 Drawing Sheets

PERSONAL COMPUTER HAVING A LOCAL BUS INTERFACE TO A VIDEO CIRCUIT

BACKGROUND OF THE INVENTION

A. Field of the Invention

The present invention relates generally to computer architecture design, and more particularly to a personal computer architecture design that improves system performance including video display performance by positioning a video control circuit in a direct path with a processing unit.

B. Description of the Related Art

Since the introduction of the IBM Personal Computer (PC will be used herein to refer not only to the IBM Personal Computer but also later-developed IBM PC clones or compatible machines) in the early 1980's to the present day, there has developed a de facto industry standard for at least a core portion of the PC's system architecture. This core portion, shown in an oversimplified manner in FIG. 1, is followed by all PC designers to maintain compatibility among different generations of PCs for the numerous application software programs that have been developed.

Figure 1:
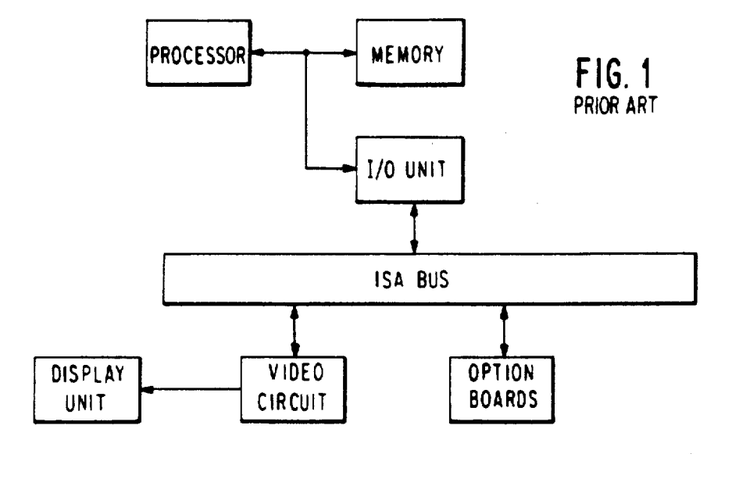
FIG. 1 shows a logical block diagram of a conventional system architecture of a personal computer.

With further reference to FIG. 1, a typical PC system architecture includes a processing unit consisting of a microprocessor and possibly a cache controller and co-processor, a memory unit, and an input/output (I/O) unit including a peripheral bus (referred to herein also as the Industry Standard bus or simply ISA bus) for connecting to expansion slots where optional peripheral devices may be inserted.

The ISA bus, which has been a part of the core design from the inception of the PC, is used to connect a variety of option boards or peripheral devices to the system or "mother board." This arrangement has provided great flexibility in configuring a PC to suit the needs of each user. The increased flexibility, however, has been at the expense of the PC's overall performance. That is, the greater flexibility usually results in slower system performance. As a result, many designers have elected to parse functions off the ISA bus. For example, many companies now provide dedicated interfaces from the microprocessor to the extended and expanded memories or hard disks.

The inventors have identified the transfer of video signals to the video controller as another one of these "bottlenecks" of the PC. Today, in accordance with the de facto standard, in order to display an image, data travels from the processor to the I/O block to the video circuit via the ISA bus, where finally the data is converted to video signals and sent to a display unit. This architecture has, at least with respect to the display of video signals, the following disadvantages. First, while the processor operates typically in the range of 16 to 33 MHz, the ISA bus transfers data only at 8 MHz. Thus, data is transferred across the ISA bus at a much slower rate. Moreover, the ISA bus operates asynchronous to the processor, and therefore the data must be resynchronized to the rate of the ISA bus prior to being transferred. Second, it is possible that the peripheral device is not the only agent trying to gain access to a processor via the ISA bus. Hence, the peripheral device must "wait its turn" prior to completing the instruction and transfer, as well as the processor must wait until an acknowledgment is received from the peripheral device that it has completed its instruction and transfer. Thus, by transferring data from the processor to the video circuit over the local bus, the performance of both the processor and peripheral device is accelerated, consequently improving overall system performance Third, the constant updating of the video display requires numerous accesses to the video circuit which means that the processor does not make infrequent trips to the video circuit, but rather spends an enormous amount of time sending and retrieving data from the video circuit. Moreover, as the more sophisticated software application programs become more and more display intensive, this constant updating only increases, resulting in very frequent trips to and from the video circuitry.

The inventors are aware of one proprietary system architecture that attempts to overcome the above problems. Generally, the proprietary method features a video circuit "straddling" a 82396SX (type designation of Intel Corp.) cache controller, such that the video circuit interfaces with address signals outputted by a 80386SX (type designation of Intel Corp.) microprocessor and with data signals outputted by the 82396SX cache controller. This design, however, is disadvantageous for the following reasons. First, it is designed specifically for a 80386SX microprocessor and 80396SX cache controller. Thus, this design is rendered useless with the newly introduced 80486 (type designation of Intel Corp.) microprocessor which incorporates a cache controller therein, or any of the next generation microprocessors. Second, the proprietary design cannot take advantage of the write post FIFO of the 82396SX cache controller, which is an important feature thereof, and therefore suffers severe performance penalties. Further, because of the peculiar nature of the design (i.e., because it straddles the cache controller) this design has very tight timing tolerances requiring fast and expensive components, which results in higher manufacturing cost.

SUMMARY OF THE INVENTION

Accordingly, it is a general object of the present invention to provide a system architecture for a PC that improves the system's overall performance, including the display of video signals, and which is free of the above-mentioned problems and disadvantages.

In accordance with the above and other objects, the present invention modifies the standard PC design architecture to overcome the noted disadvantages by directly interfacing a video control circuit with a processing unit. That is, the video control circuitry resides on a local bus to allow direct access to and from the processing unit. As a result, the video control circuitry can be designed to operate at the processor speed (typically in the range of 16 to 33 MHz), which is much greater than the operating speed of the ISA bus (i.e., 8 MHz). Moreover, synchronization delays due to interfacing the local bus, which operates at one frequency (i.e., 16 to 33 MHz), to the ISA bus, which by industry standard operates at 8 MHz, are avoided. Consequently, by placing the video control circuit on the local bus, the overall system performance is improved.

That is, in accordance with the above and other objects, the present invention provides a system architecture for a personal computer including processing means coupled to a local bus for processing data, and video means for conditioning data received from the processing means and for displaying the conditioned data on a display unit, the video means being coupled to the local bus such that data can be transferred on the local bus from the processing means to the video means and from the video means to the processing means.

Also in accordance with the above and other objects, the present invention provides a system architecture for a personal computer including processing means coupled to a local bus for processing data, interface means coupled to the local bus and a peripheral bus for interfacing the processing means to the peripheral bus, and video means for conditioning data received from the processing means and for displaying the conditioned data on a display unit, the video means being coupled to the local bus and the peripheral bus such that data can be transferred from the processing means to the video means and from the video means to the processing means via one of two signal paths.

Further in accordance with the above objects, the present invention provides a system architecture for a personal computer including processing means coupled to a local bus for processing data, interface means for coupling the local bus to a peripheral bus, video interface means, coupled to the local bus, the peripheral bus, and a video bus for passing data from one of the local bus and the peripheral bus to a video bus, and video control means coupled to the video bus for conditioning data received from the processing means and for displaying the conditioned data on a display unit, wherein data transferred from the processing means to the video control means traverses one of two signal paths the first signal path comprising the local bus and the video bus, and the second signal path comprising the local bus, the peripheral bus, and the video bus.

Still further, the present invention provides a system architecture for a personal computer composing processing means coupled to a local bus for processing data, interface means, responsive to a set of control signals and coupled to the local bus and a peripheral bus, for interfacing the processing means to the peripheral bus, video means, responsive to the set of control signals, for conditioning data received from the processing means and for displaying the conditioned data on a display unit, the video means being coupled to the local bus and the peripheral bus such that data can be transferred between the processing means and the video means via one of first and second signal paths, and control means, responsive to at least one output of the processing means and video means, for generating the set of control signals over a control bus to respectively enable the first and the second signal paths.

Yet further, the present invention provides a system architecture for a personal computer comprising processing means coupled to a local bus for processing data, interface means responsive to a first set of control signals for coupling the local bus to a peripheral bus, video interface means coupled to the local bus, the peripheral bus, and a video bus and responsive to a second set of control signals for passing data from one of the local bus and the peripheral bus to a video bus, video control means coupled to the video bus for conditioning data received from the processing means and for displaying the conditioned data on a display unit, and control means responsive to an output of the processing means and video control means for generating the first and second set of control signals and establishing first and second signal paths to enable the processing means to transfer data to the video control means via one of the first and second signal paths, wherein the first signal path comprises the local bus and the video bus, and the second signal path comprises the local bus, the peripheral bus, and the video bus.

Yet further, the present invention provides a control means including a local control means coupled to the control bus for generating a second set of control signals to control data transfers over the first signal path, and peripheral control means coupled to the control bus for reproducing a third set of control signals to control the data transfers over the second signal path, wherein, the second set of control signals include control signals that constitute a duplicate copy of the third set of control signals, and only one of the second and third sets of control signals is applied to the control bus at a time.

The above and other objects, features, and advantages of the present invention will become more apparent from the following detailed description taken in conjunction with the accompanying drawings.

DETAILED DESCRIPTIONS OF THE PREFERRED EMBODIMENTS

Figure 2:
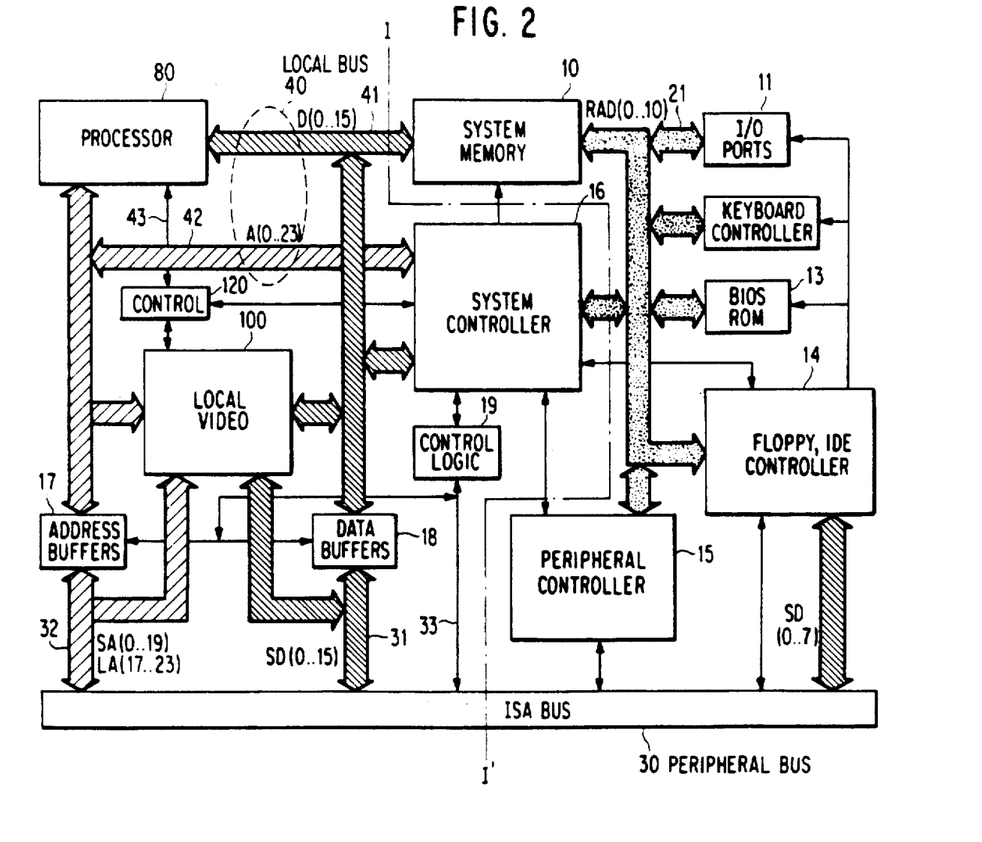
FIG. 2 shows a block diagram of a system architecture of a personal computer in accordance with the present invention.

Beginning with reference to FIG. 2, there is shown a block diagram of a system architecture of a personal computer (PC) in accordance with the present invention. The system architecture is built upon four buses, namely, a local bus 40, a peripheral bus 30, a multi-function bus 21, and a video bus 110 (shown and described below with reference to FIG. 4). The local bus 40, which refers collectively to a local address bus 42 and local data bus 41, interfaces a PROCESSOR block 80 to a SYSTEM MEMORY block 10, a LOCAL VIDEO block 100, an I/O SYSTEM CONTROLLER 16, and address and data buffers 17 and 18. The ISA bus 30, which refers collectively to an ISA address bus 32 and ISA data bus 31, interfaces the system or mother board to other optionally installed peripheral devices, such as serial and parallel ports, additional memory cards, modems, etc. Finally, the multi-function bus 21, which is an 11-bit address/data time multiplexed bus, provides row and column address information to the SYSTEM MEMORY block 10, access to I/O ports 11, a keyboard controller 12, a BIOS read-only memory (ROM) 13, and allows communication among an LSI (large scale integration) chip set. The chip set, which is an "off the shelf" product of Western Digital Corp., includes the I/O SYSTEM CONTROLLER 16, DISK CONTROLLER 14, and PERIPHERAL CONTROLLER 15.

The address buffer 17 interfaces the local address bus 42 to the ISA address bus 32 so that address information can be transferred from one bus to the other bus Similarly, the data buffer 18 interfaces the local data bus 41 to the ISA data bus 31 over which data information is transferred between the two. A LOCAL BUS CONTROL block 120 controls the operation of the PC, and particularly controls communications among the PROCESSOR block 80, the LOCAL VIDEO block 100, SYSTEM MEMORY block 10, and the I/O SYSTEM CONTROLLER 16.

The construction and function of the components shown to the right of the dot-dash line I—I' in FIG. 2, along with their interface to the local bus 40 and ISA bus 30 is well within the knowledge of one skilled in the personal computer arts and, therefore, further explanation relating to this portion of the PC's system architecture is omitted.

Figure 3A:
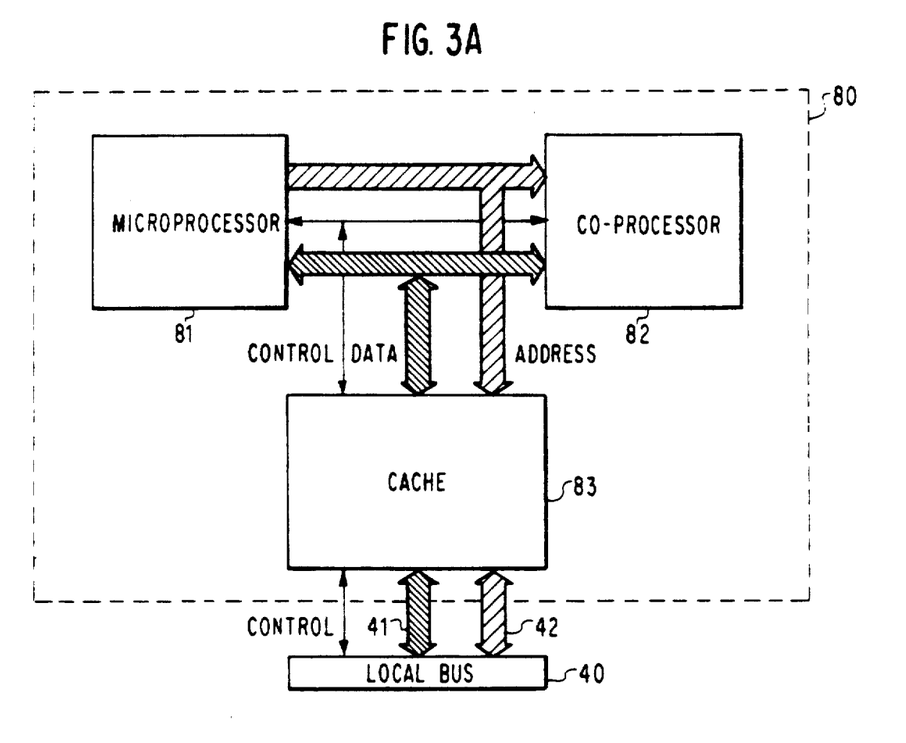
FIGS. 3A, 3B, 3C, 3D, 3E, and 3F show further detailed block diagrams of the PROCESSOR block of FIG. 2.
Figure 3B:
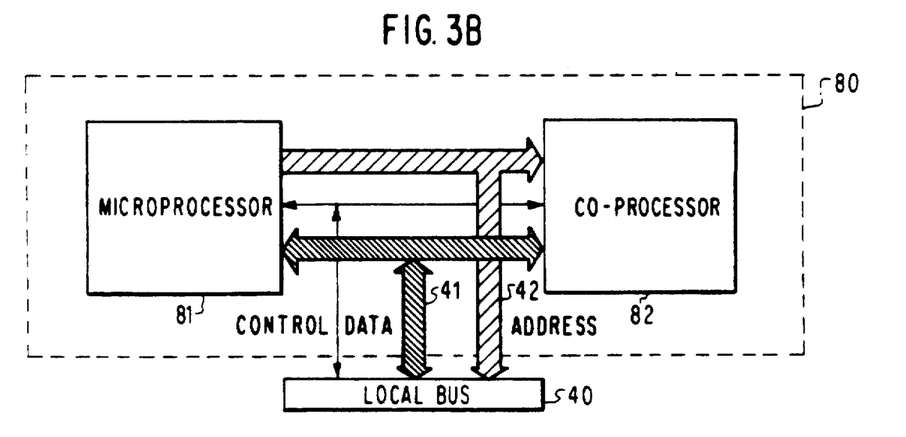

The PROCESSOR block 80 (as shown in FIGS. 3A and 3B), in general, includes at least a microprocessor 81, and possibly a co-processor 82 and/or cache controller 83, which components are installed at the option of the end user for enhanced performance. Although the type of components (i.e., the microprocessor 81, co-processor 82, and cache controller 83) in the PROCESSOR block 80 are not limited to those shown in FIGS. 3C to 3F, they must be compatible with the 80X86 Intel family of microprocessors. In other words, the components must be PC compatible.

Figure 3C:
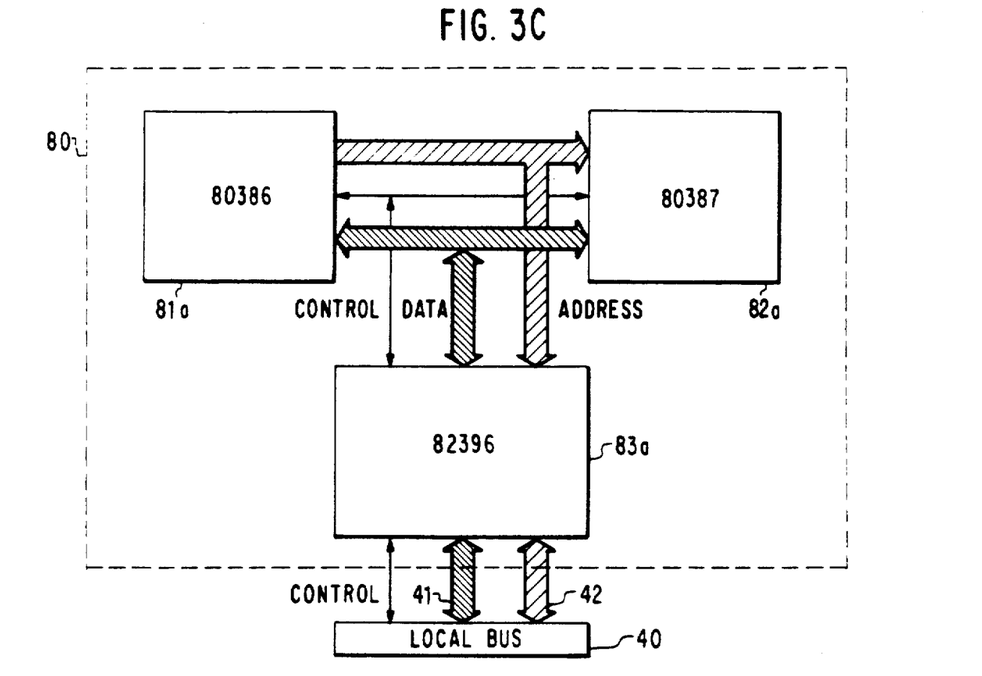

As an example, FIG. 3C shows a block diagram of the PROCESSOR block 80 including a 80386-type microprocessor 81a, 80387-type co-processor 82a, and 82396-type cache controller 83a coupled to the local bus 40. The interconnection of these components to the processor bus 84 is conventional and well within the skill of those familiar with this art.

As one skilled in the art and familiar with the Intel family of microprocessors would also know, the interface of the cache controller 83 to the local bus 40 emulates the 80386 microprocessor's interface. Therefore, should the cache controller 83 not be installed, the interface by the microprocessor 81 to the local bus 40 and the remaining system components remains unchanged, although timing constraints are different at the cache interface as compared to the processor interface.

Figure 3D:
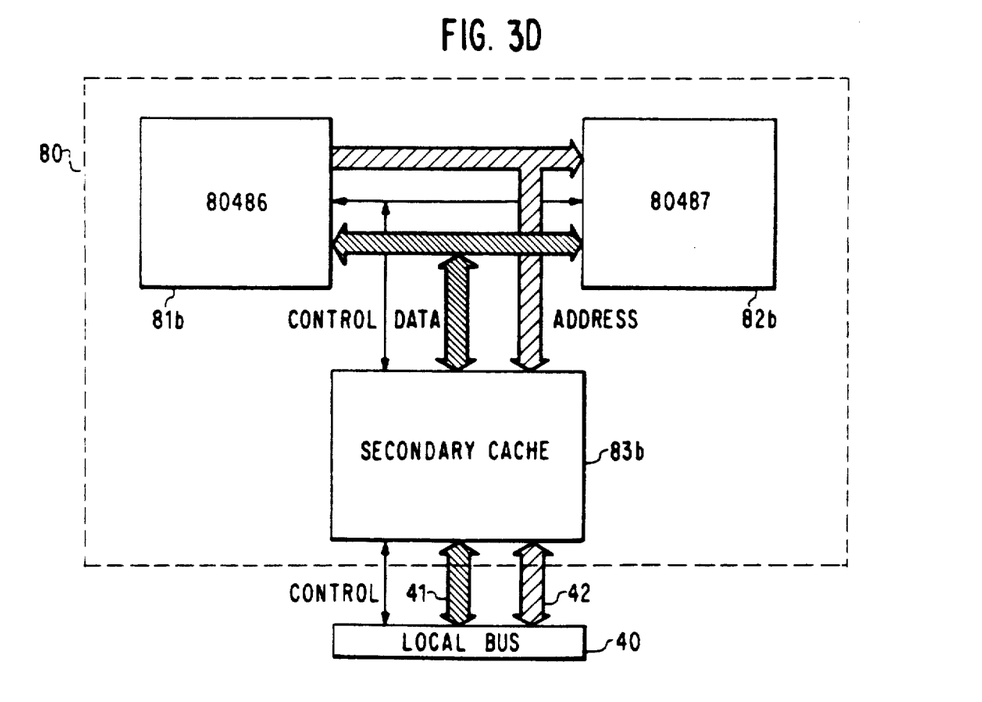

The PROCESSOR block 80 may also be constructed as shown in FIG. 3D, which arrangement includes an 80486-type microprocessor 81b, 80487 co-processor 82b, and a secondary cache 83b. The 80486-type microprocessor differs from the 80386-type microprocessor 81a in that a cache controller is located within the chip. Thus, an external cache controller, i.e., the secondary cache 83b, is optional and probably would not be a necessary component. The co-processor 82b again is an optional component.

Figure 3E:
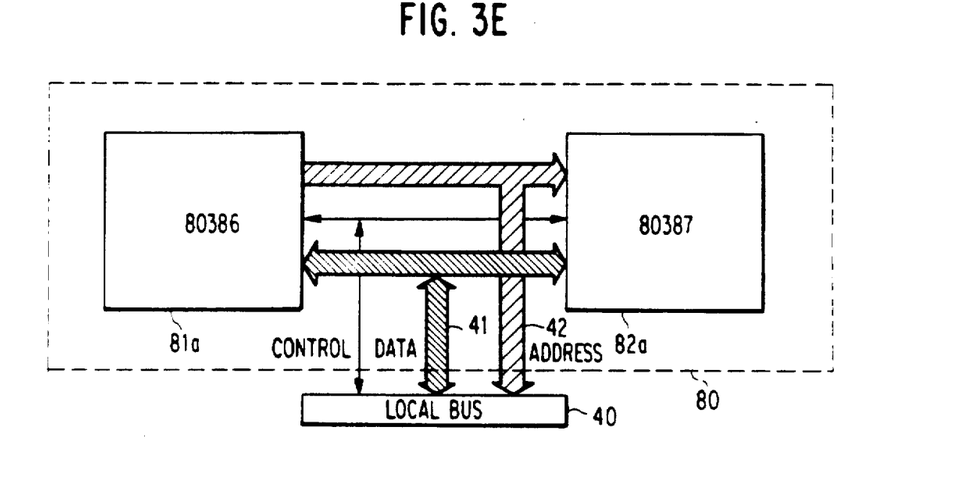
Figure 3F:
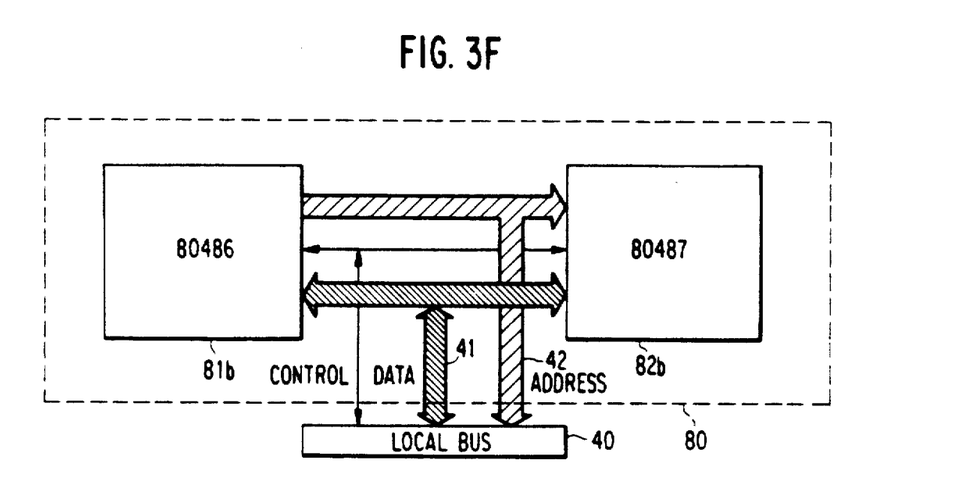

FIGS. 3E and 3F illustrate other examples of possible configurations of the PROCESSOR block. Here there are shown microprocessors 81a and 81b interfacing directly to the local bus 40. As in the previous examples, the co-processors 82a and 82b are an optional components.

Figure 4:
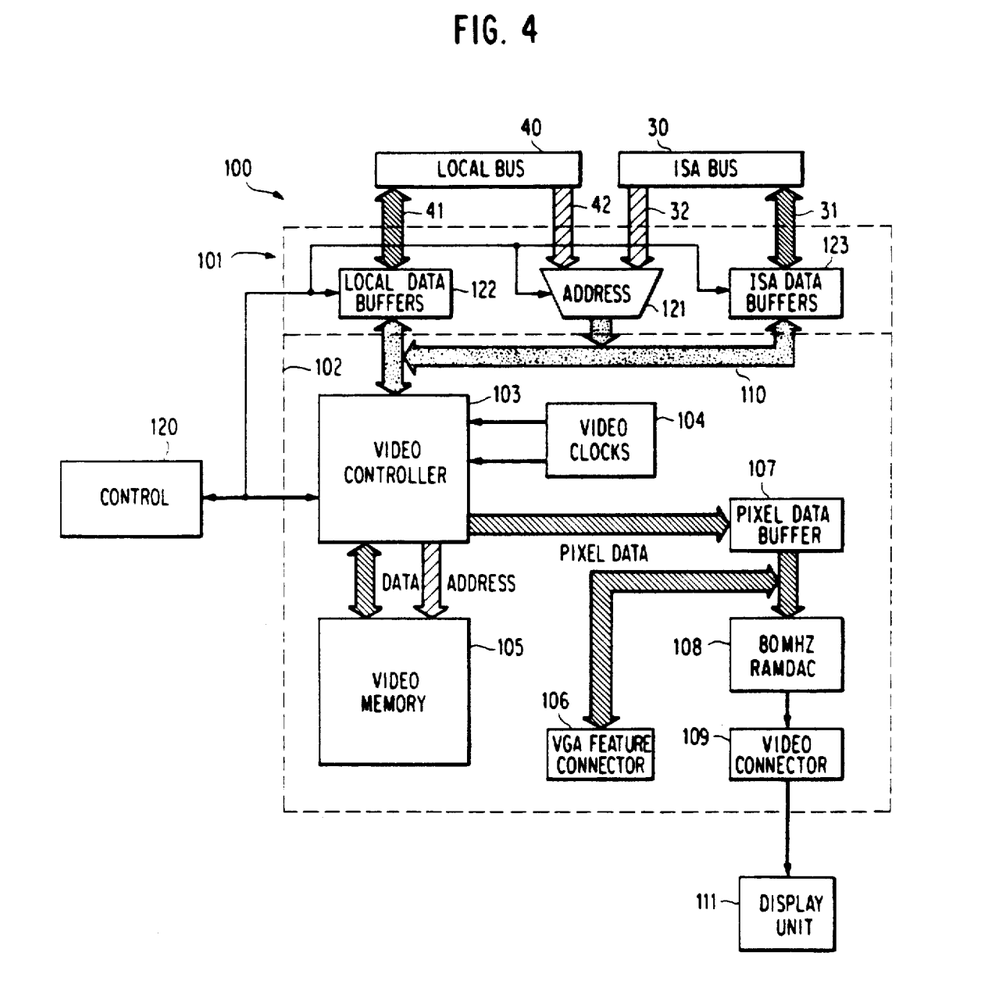
FIG. 4 shows a block diagram of the LOCAL VIDEO block of FIG. 2.

Referring now to FIG. 4, there is shown a block diagram of the LOCAL VIDEO block 100. The LOCAL VIDEO block 100 includes a video interface circuit 101 and a video control circuit 102 connected to one another via the video bus 110, which is an address-/data time multiplexed bus (i.e., address and data transfers are performed over the same physical electrical bus in a time sequence manner).

The video interface circuit 101 interfaces either the local bus 40 or ISA bus 30 to the video control circuit 102 via the video bus 110. The video interface circuit 101, which is shown in detail in FIG. 5, includes local and ISA data buffers 122 and 123 for transferring data information, and an address multiplexer 121 for selecting and passing address information from either the local address bus 41 or ISA address bus 32 to the video bus 110.

The video control circuit 102 includes as its major components a video controller chip 103, such as Tseng Labs ET4000 Graphics Controller, video memory 105 capable of supporting up to 1024×768 resolution and 256 colors, a pixel data buffer 107, an 80 MHz RAM-DAC 108 (i.e., a random-access memory digital to analog converter), video clocks 104, and connectors 106 and 109, one of which is used for connecting to a display unit 111. The arrangement, selection, and interconnection of these components is conventional and well within the skill of those familiar with this art. In fact, this video control circuit 102 can also be (and has been) used as a peripheral video controller card device, that is, one which resides completely on the ISA bus 30 as in conventional PCs. Moreover, the present invention is not limited to this type of video control circuit 102. Specifically, with minor modifications which would be obvious to one skilled in the art, the ET4000 Graphics Controller could be replaced with other third party video controllers, such as Western Digital 90C11, ATI 28800, Headland HD216, and S3 Inc. 86C911 GUI Accelerator.

Figure 5:
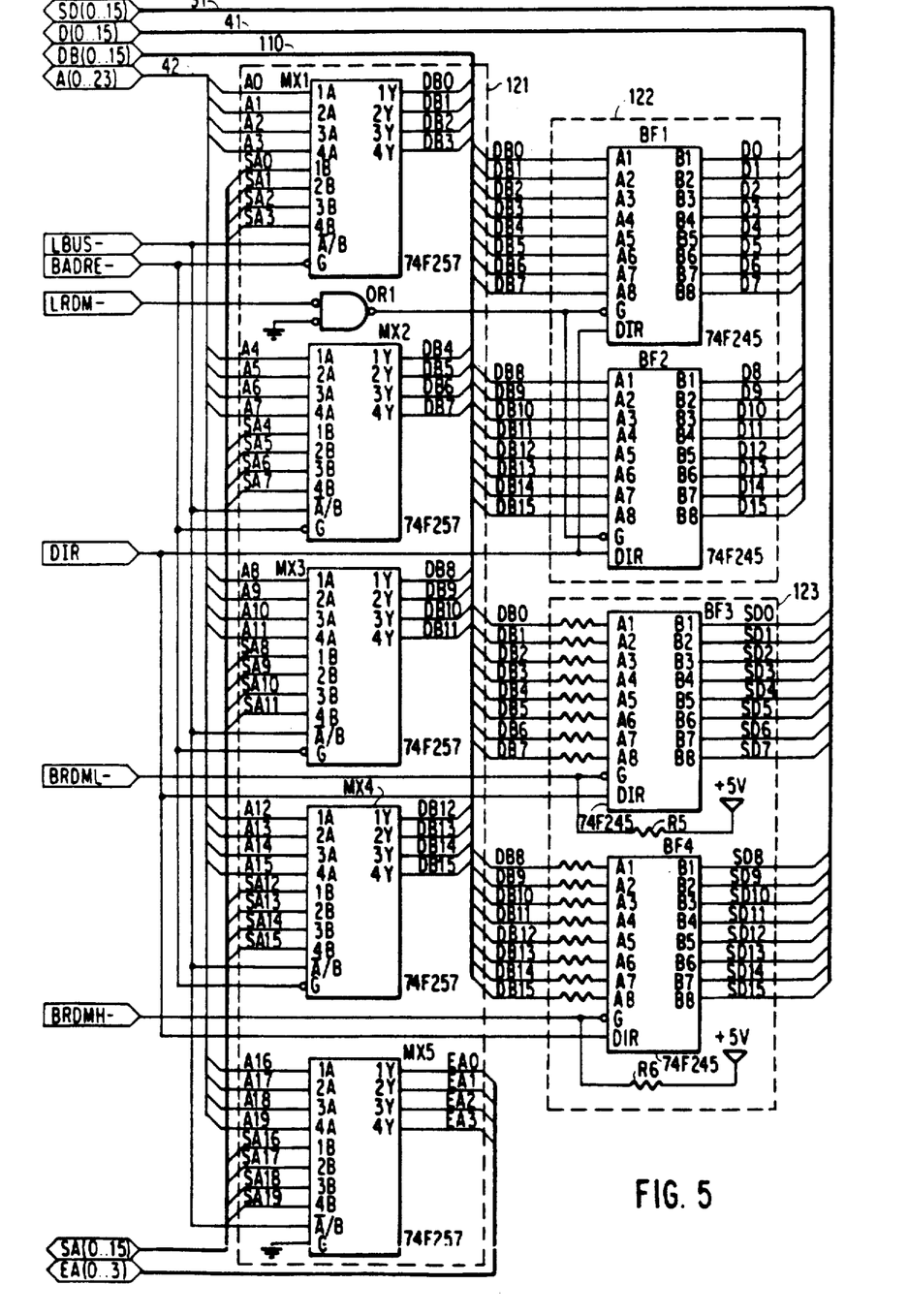
FIG. 5 shows a detailed circuit schematic of the video interface circuit of FIG. 4.

Referring now to FIG. 5, there is shown a circuit schematic of the video interface circuit 101, which includes the address multiplexer 121, local data buffers 122, and ISA data buffers 123. The address multiplexer 121 includes five quad two-input, tri-state multiplexers (74F257) Mx1, Mx2, Mx3, Mx4, and MX5. A first set of inputs 1A, 2A, 3A, and 4A of the five multiplexers MX1, MX2, MX3, MX4, and MX5 is respectively coupled to the address lines A[0]-A[3], A[4]-A[7], A[8]-A[11], A[12]-A[15], and A[16]-A[19] of the local address bus 42. Similarly, a second set of inputs 1B, 2B, 3B, and 4B of the five multiplexers MX1, MX2, MX3, MX4, and MX5 is respectively coupled to the address lines SA[0]-SA[3], SA[4]-SA[7], SA[8]-SA[11], SA[12]-SA[15], and SA[16]-SA[19] of the ISA address bus 32. The outputs 1Y, 2Y, 3Y, 4Y of the multiplexers MX1, MX2, MX3, and MX4 are respectively coupled to the video address/data signals DB[0]-DB[3], DB[4]-DB[7], DB[8]-DB[11], and DB[12]-DB[15]. The outputs 1Y, 2Y, 3Y, and 4Y of the fifth multiplexer MX5 are respectively coupled to an extended, dedicated address bus EA[16]-EA[19] of the video graphics controller 103.

Control signals LBUS* and BADRE* (the symbol * is used herein to denote an active LOW signal) are respectively coupled to the input select $\overline{A/B}$ and output enable inputs G of the multiplexers MX1, MX2, MX3, MX4, and MX5 (except the output enable input G of the multiplexer MX5 is connected to ground and not to the control signal BADRE*) The control signal LBUS* controls, which one of the first or second set of inputs, is passed through to the outputs of the multiplexers MX1, MX2, MX3, MX4, and MX5. Therefore, when the signal LBUS* is asserted LOW, the first set of inputs, that is, signals A[0]-A[19] of the local address bus 42, are passed to the outputs 1Y, 2Y, 3Y, 4Y. On the other hand, when LBUS* is not asserted (i.e., HIGH), the address signals SA[0]-SA[19] of the ISA bus 30 are selected and applied to the outputs 1Y, 2Y, 3Y, 4Y. When the output enable signal BADRE* is asserted, the multiplexers MX1, MX2, MX3, and MX4 drive the selected set of inputs onto the video bus 110, otherwise, the multiplexers MX1-MX4 are in a high impedance mode.

The local data buffer 122 includes two octal bus, tri-state transceivers (74F245) BF1 and BF2. Inputs/outputs A1-A8 of the first and second transceivers BF1 and BF2 are respectively coupled to the lower and upper eight bits of the video bus 110 (i.e., DB[0]-DB[7] and DB[8]-DB[15]). The inputs/outputs B1-B8 of the first and second transceivers BF1 and BF2 are respectively coupled to the lower and upper eight bits of the local data bus 41 (i,e , D[0]-D[7] and D[8]-D[15]) of the local bus 40.

The ISA data buffer 123 also includes two octal bus, tri-state transceivers (74F245) BF3 and BF4 having inputs/outputs A1-A8 and B1-B8. The first set of inputs of the transceivers BF3 and BF4 are respectively coupled, via series resistors, to the lower and upper eight bits of the video bus 110 (i.e., DB[0]- DB[7] and DB[8]-DB[15]). The inputs/outputs B1-B8 of the transceivers BF3 and BF4 are respectively coupled to the lower and upper eight bits of the ISA data bus 31 (i.e., SD[0]-SD[7] and SD[8]-SD[15]) of the ISA bus 30.

A control signal LRDM*, which is an output of the LOCAL BUS CONTROL block 120, is coupled to the output enable input G of the transceivers BF1 and BF2, and control signals BRDML* and BRDMH* are respectively coupled to an output enable input G of each ISA data buffer transceiver BF3 and BF4. Direction inputs DIR of all four transceivers BF1, BF2, BF3, and BF4 are connected to the control signal DIR which is an output of the video control circuit 102 and, specifically, an output of the video controller 103.

Figure 6:
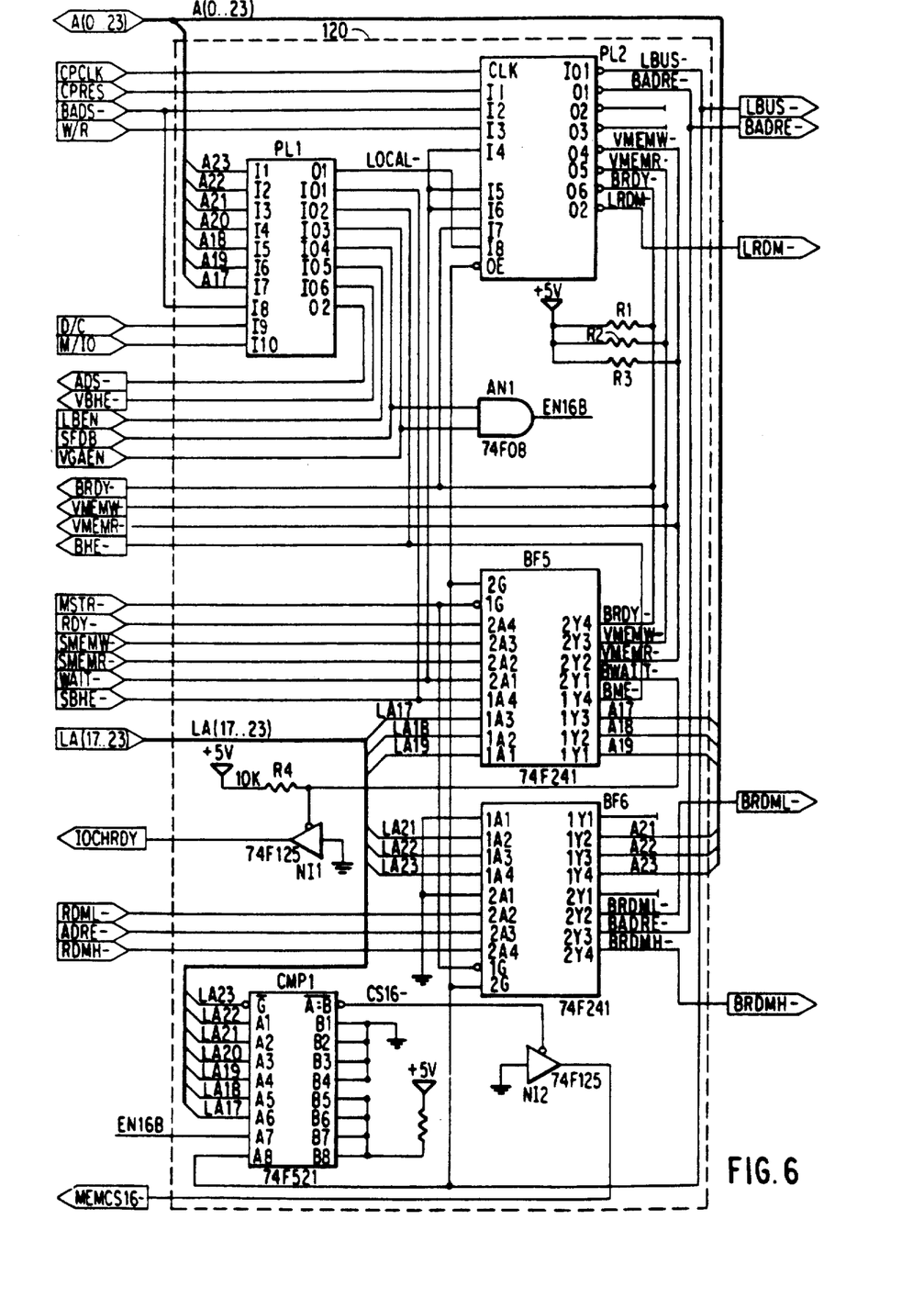
FIG. 6 shows a detailed circuit schematic of the LOCAL BUS CONTROL block of FIG. 2

The LOCAL BUS CONTROL block 120 schematic is shown in detail in FIG. 6. The block 120 includes two programmable array logic (PAL) ICs PL1 and PL2, two octal bus/line, tri-state drivers (74F241) BF5 and BF6, an octal comparator (74F521) CMP1, an AND gate (74F08) AN1. two tri-state buffers (74F125) N11 and N12, an OR gate (74F32) OR1, and resistors R1-R4.

The local bus video access PAL PL1 provides as outputs three signals LOCAL*, ADS*, and VBHE* whose function is defined by the PAL equations shown in TABLE 1. Inputs I1-I7 of the PAL PL1 are respectively coupled to address signals A[23], A[22], A[21], A[20]. A[18], A[19], and A[17] of the local address bus 42. Inputs I8, I9, I10, and I17 are respectively connected to signals BADS*, D/C, M/IO, and BHE*, all of which are outputs of the PROCESSOR block 80. The signal BADS* indicates that new valid address and other cycle definition information is currently being driven onto the local bus 40. The control signal M/IO distinguishes memory cycles from I/O cycles and the control signal D/C distinguishes data cycles (i.e., memory or I/O cycles) from control cycles (e.g., interrupt processing information). The signal BHE* indicates when the high data byte of the local data bus 41 (i.e , D[8]-D[15]) is enabled. Another byte enable signal SBHE*, which is coupled to input IO1 of the PAL PL1, originates from the ISA bus 30 and indicates during a transfer on the ISA bus whether the high data byte of the ISA data bus 31 (i.e., SD[8]-SD[15]) is enabled.

The local bus control signal LBEN, which is software controllable, is coupled to an input I05 of the PAL PL1 and, if set, enables accesses to the LOCAL VIDEO block 100 via the local bus. If not asserted, all LOCAL VIDEO block accesses via the local bus 40 are disabled and any access to the LOCAL VIDEO block occurs via the ISA bus 30. A second software controlled signal VGAEN is coupled to another input I03 of the PAL PL1 and indicates whether VGA mode is enabled. Thus, direct access to the LOCAL VIDEO block 100 via the local bus 40 only occurs when both signals LBEN and VGAEN are asserted.

The control signal SFDB, which is coupled to input I04, is an output of the video control circuit 102 and indicates whether 16-bit accesses (as opposed to 8-bit accesses) to the video controller chip 103 are permitted With further reference to TABLE 1, the outputs LOCAL*, ADS*, and VBHE* will be explained. The local bus video access decode signal LOCAL* is asserted on transactions to the LOCAL VIDEO block 100 and is applied to an input I8 of the second PAL PL2. For the control signal LOCAL* to be asserted, the following conditions must be true: the address signals A[17]-A[23] must be respectively equal to HIGH, LOW, HIGH, LOW, LOW, LOW, LOW (i.e., the address signals asserted by the PROCESSOR block 80 are within the range of A0000 (hex) to BFFFF (hex)) when the control signals DC, MIO, LBEN, SFDB, and VGAEN* are asserted HIGH, HIGH, HIGH, HIGH, and LOW. In other words, the control signal LOCAL* is asserted LOW to indicate that the PROCESSOR block 80 operation is attempting to read or write data to or from the LOCAL VIDEO block 100 (i.e., a "local video" access). On the other hand, if the control signal LOCAL* is not asserted, the current operation is not to the LOCAL VIDEO block 100, but rather to the I/O SYSTEM CONTROLLER 16 in which the signal ADS* is asserted.

The output signal ADS*, which equals the inverse of the signal LOCAL* logically AND'ed with the control signal BADS*, is applied to an input of the I/O SYSTEM CONTROLLER 16. Thus, if there is not a "local video" access (i.e., the signal LOCAL* is not asserted), the address strobe signal BADS* is effectively passed to the I/O SYSTEM CONTROLLER 16, which indicates to the I/O SYSTEM CONTROLLER 16 when the local bus address information is valid. Conversely, BADS* is not applied to the I/O SYSTEM CONTROLLER if the signal LOCAL* is not asserted.

Finally, the control signal VBHE is coupled to an input of the LOCAL VIDEO block 100 and is set to either the high byte enable signal BHE or SBHE depending upon whether the current bus transaction is a "local video" access. Thus, for a "local video" access, the control signal VBHE will be set to equal the control signal BHE, otherwise, the signal VBHE is set to the control signal SBHE.

The second PAL PL2 puts out six control signals LBUS*, BADRE*, VMEMR*, VMEMW*, BRDY*, and LRDM* via the outputs I01, 01, 04, 05, 06, and I02, respectively. There are also two other signals PHI2 and LBUSQ, but these signals are used only internally to the PAL PL2.

Inputs of the PAL PL2 include a clock input CLK and reset input I1, which are respectively coupled to a system clock signal CPCLK and system reset signal CPRES. Control signals BADS*, W/R, HOLD, and HLDA, which are all outputs of the PROCESSOR block 80, are respectively coupled to inputs I2, I3, I4, and I5 of the PAL PL2. The signal BADS*, as stated above, indicates when address and other control information provided by the PROCESSOR block 80 is valid. The signal W/R indicates whether the current cycle is a read or write operation. Control signals HOLD and HLDA are bus arbitration signals which indicate when the PROCESSOR block 80 has control of the local and ISA buses 40 and 30.

Another input 16 is coupled to a control output WAIT* of the LOCAL VIDEO block 100 and is asserted to stretch the current processor cycle providing more time for the LOCAL VIDEO block 100 to respond to the current request Input 17 is coupled to a control signal RDY* which is an output of the I/O SYSTEM CONTROLLER 16 for indicating the completion of the current transaction. Input 19 is coupled to the local bus video access decode signal LOCAL* which is outputted by the PAL PL1.

With further reference to TABLE 2, the outputs LBUS*, BADRE*, VMEMR*, VMEMW*, BRDY*, and LRDM* are explained. The output LBUS* is the combinatorial output of LBUSQ (which is a registered output used solely within the PAL PL2). Thus, LBUS* will equal LBUSQ notwithstanding typical (10 ns maximum) internal delays of the PAL PL2. The signal LBUSQ is set at the end of each transaction (i.e., that is when the signal RDY* is asserted) and at system resets, and is cleared during the current transaction if there is not a "local video" access, which is indicated by whether the signal LOCAL* is asserted or not. Importantly, the signal LBUS* is asserted at the end of each transaction for the next transaction on the assumption that the next transaction is a "local video" access. This assumption enables faster "local video" accesses because local bus address and control setup times can be met earlier. The signal LBUS* is fed back to input 19 of the same PAL PL2 where it is used as an output enable signal and is coupled to the $\overline{A}/B$ inputs of the multiplexers MX1-MX5 of the address multiplexer 121, an input A8 of the comparator CMP1, and output enable inputs 2G of the bus/line drivers BF5 and BF6.

The output BADRE* is coupled to the output enable inputs G of the address multiplexers MX1-MX4 of the video interface 101, thereby enabling the outputs of the four multiplexers MX1-MX4 when asserted. The output enable input G of the fifth multiplexer MX5 is grounded, and therefore the outputs are always enabled.

The outputs VMEMR* and VMEMW*, which are each pulled up to five volts via a 10 k ohm resistor R2 and R3, are coupled to inputs of the video control circuit 102 for requesting either a memory read or a memory write to the LOCAL VIDEO block 100. As shown in TABLE 2, VMEMR* is asserted at the beginning of a local bus cycle for a "local video" read access and held until the end of the current local bus transaction. Similarly, VMEMW* is asserted at the beginning of a local bus cycle for a "local video" write access and held until the transaction completes.

The output BRDY*, which is also pulled up to five volts via a 10 k ohm resistor R1 is coupled to an input of the PROCESSOR block 80 to indicate that the current bus cycle has completed.

Finally, the output signal LRDM* is coupled, via an OR gate OR1, to the output enable inputs G of the transceivers BF1 and BF2 of the local data buffers 122. The signal LRDM* enables the outputs of the local data buffers 122 and is set during "local video" accesses, except during the "address phase" of the transaction. The OR gate OR1 delays the signal LRDM*, and consequently delays the enabling of the outputs of the transceivers BF1 and BF2 so that the data hold time requirements of the video controller 103 are satisfied.

The bus/line drivers BF5 and BF6, with respect to LOCAL VIDEO block accesses, provide substantially a duplicate set of control signals to that which PAL PL2 supplies. More specifically, the first set of inputs 1A1, 1A2, 1A3, and 1A4 of driver BF5 are respectively coupled to LA19, LA18, LA17, and SBHE*. The second set of inputs 2A1, 2A2, 2A3, and 2A4 are respectively coupled to the signal WAIT*, which is an output of the video circuit 102, SMEMR*, SMEMW*, and RDY*, which originate from the I/O SYSTEM CONTROLLER 16.

On the other hand, with respect to the second bus/line driver BF6, the first set of inputs 1A2, 1A3, and 1A4 are coupled to the latchable address lines LA[21], LA[22], and LA[23]. The second set of inputs 2A2, 2A3, and 2A4 are respectively coupled to control signals RDML*, ADRE*, and RDMH*, which are all outputs of the video controller 103 within the video circuit 102. The inputs 1A1 and 2A1 are not used and therefore are simply tied to ground potential.

The output enable 1G for the first set of outputs 1Y1, 1Y2, 1Y3, and 1Y4 for both of the bus/line drivers BF5 and BF6 is coupled to a control signal MSTR* which indicates that a device, not necessarily the PROCESSOR block 80, is currently master of the local bus. That is, other devices which may reside on the ISA bus can request for and be granted control of the ISA bus and local bus through the I/O SYSTEM CONTROLLER 16. The output enable 2G for the second set of outputs 2Y1, 2Y2, 2Y3, and 2Y4 is coupled to the output LBUS* of the PAL PL2. Therefore, the control signal MSTR* is asserted for all transactions by the PROCESSOR block 80 thereby enabling the first set of outputs 1Y1, 1Y2, 1Y3, and 1Y4 of both bus/line drivers BF5 and BF6. On the other hand, only one of the second set of outputs 2Y1, 2Y2, 2Y3, and 2Y4 of the bus/line drivers BF5 and BF6 is enabled depending on whether LBUS* is asserted. Thus, when the output LBUS* is not asserted (i.e., there is not a "local video" access), the second set of outputs are enabled.

It is important to note at this time that the video controllers as identified herein are designed for the specific application of interfacing to the ISA bus 30. That is, video controllers are made specific for personal computers wherein the video control circuitry resides on the ISA bus as in the conventional PC architecture. Particularly, one familiar with the art would easily be able to correspond the second set of outputs of the drivers BF5 and BF6, that is, the output signals BRDY*, VMEMW*, VMEMR*, BRDML*, BADRE*, BRDMH*, which are either signals which originate from the video controller 103 or whose destination is the video controller 103, to their function within a conventional PC system architecture (FIG. 1).

The inventors have discovered, unfortunately, that because the video controllers 103 are designed to interface only to the ISA bus 30, which operates at only 8 MHz, these signals provide output delays ranging from 20 ns to 30 ns. Thus, when implementing the "local video" design, the inventors have ignored these signals and in place provide essentially a duplicate copy of these signals for only data transfers between the PROCESSOR block 80 and the LOCAL VIDEO block 100 via the local bus 40. In other words, for data transfers between the PROCESSOR block 80 and the LOCAL VIDEO block 100, the first set of control signals are used for transfers over the ISA bus 30 and ignored for transfers over the local bus 40. On the other hand, the second set of control signals are ignored for transfers over the ISA bus 30 and used only for transfers over the local bus 40.

This duplicate set of signals are provided by the PAL PL2 which includes the output signals BADRE*, VMEMR*, VMEMW*, BRDY*, and LRDM*. Because the PAL PL2 can respond or generate these signals with a maximum propogation delay of 10 ns, as will be explained further below, the duplicate set of control signals enables cycle times for "local video" accesses to three clock periods (e.g., at a 20 MHz clock frequency).

The comparator CMP puts out a signal CS16* which is connected to an output enable input G of the tri-state buffer NI2 causing the signal MEMCS16* to be asserted onto the ISA bus. The assertion of the signal latchable address signals LA[23]-LA[17] are within the address range of 0A0000 (hex) to 0BFFFF (hex), the video controller 103 is in a 16-bit mode (i.e., EN16B is asserted), and the access to the LOCAL VIDEO block 100 is through the ISA bus 30.

As a result, the tri-state buffer NI2 is enabled to cause the control signal MEMCS16*, which is applied to the ISA bus 30, to be asserted LOW.

TABLE 1

| LOCAL | = | /A23 * /A22/ * /A21 * /A20 * /A19 * /A18 * /A17 |
|---|---|---|
|  |  | DC * MIO * LBEN * SFDB * VGAEN |
| ADS | = | /LOCAL * BADS |
| VBHE | = | LOCAL * BHE + /LOCAL * SBHE |

TABLE 2

| PHI2 | := | CPRES |
|---|---|---|
|  | + | /PHI2 |
| LBUSQ | := | CPRES |
|  | + | /BADS * PHI2 * RDY * /HLDA |
|  | + | HLDA * /HOLD |
|  | + | /(BADS * PHI2 * /LOCAL + HLDA) * LBUSQ |
| VMEMR /CPRES | := | (LOCAL * BADS * PHI2 * /WR + VMEMR * /BRDY) * |
| VMEMW /CPRES | := | (LOCAL * BADS * PHI2 * WR + VMEMW * /BRDY) * |
| BADRE | := | /(VMEMR + VMEMW) + CPRES |
| RDM | = | (VMEMR + VMEMW) * /BADRE |
| LBUS | = | LBUSQ |

MEMCS16* indicates to any bus master other than the processor that a 16-bit data transfer (as opposed to an 8-bit data transfer), via the ISA bus 30, to the LOCAL VIDEO block 100 is permitted.

When the PROCESSOR block 80 is the bus master, which is the typical case, the function of the comparator is practically useless because, as will be described below, all transfers to the LOCAL VIDEO block 100 in which the video controller 103 is in a "16-bit mode" do not occur over the ISA bus 30 but only over the local bus 40, with one exception. The exception will only occur during design debug, in which it is desirable to force the PROCESSOR block 80 to transfer 16-bits of data to the LOCAL VIDEO block 100 via the ISA bus. In this limited situation, by setting the signal LBEN through software, all data transfers to and from the LOCAL VIDEO block 100 will occur over the ISA bus 30. Other than this exception, the function of the comparator is only utilized during transfers to the LOCAL VIDEO block 100 by an ISA bus master (which does not include the PROCESSOR block 80) when the video controller 103 is in the "16-bit mode."

With further reference to FIG. 6, the first set of inputs A1, A2, A3, A4, A5, and A6 of the comparator CMP1 are respectively coupled to the latchable address LA22, LA21, LA20, LA18, LA19, and LA17. Input A6 is coupled to the signal EN16B which is the output of an AND gate AN1 whose first and second inputs are respectively coupled to the control signals SFDB and VGAEN. Another input A8 is coupled to the control signal LBUS* from the output 101 of the PAL PL2. The output enable signal G is coupled to the latchable address LA23 so that when the address LA23 equals a LOW value the comparator's output $\overline{A=B}$ is enabled. The second set of inputs B1-B8 are tied either to a five volt potential or ground potential such that when the first set of inputs A1-A8 match the pattern LOW, LOW, LOW, LOW, HIGH, HIGH, HIGH, HIGH, the output $\overline{A=B}$ signal CS16* is asserted LOW. In other words, the signal CS16* is asserted LOW when the Next, the operation of the thus constructed PC system architecture will be explained with primary focus on data read and write cycles to the LOCAL VIDEO block 100 by the PROCESSOR block 80 via either one of two signal paths (i.e., the local bus 40 and the ISA bus 30). For the purposes of the present description, it will be assumed that the software controlled signals VGAEN and LBEN are set so that VGA mode and "local video" accesses are enabled.

As will be become further apparent with the following description, data transfers between the PROCESSOR block 80 and the LOCAL VIDEO block 100 occur via one of two signal paths. The first signal path includes simply the local bus 40. On the other hand, the second signal path includes the local bus 40 and the ISA bus 30. The path upon which data transfers occur depends on the mode of the video controller 103, which in this embodiment is the Tseng Labs ET4000. More specifically, the assertion of the signal SFDB HIGH by the video controller 103 indicates that the video controller is in a "16-bit" mode in which case data transfers are performed over the first signal path. Conversely, when the signal SFDB is asserted LOW, the video controller is in an "8-bit" mode and data transfers occur over the second signal path. Thus, data transfers between the PROCESSOR block 80 and the LOCAL VIDEO block 100 will fall within one of the following states: 1) 16-bit mode, read cycle; 2) 16-bit mode, write cycle; 3) 8-bit mode, read cycle; and 4) 8-bit mode, write cycle.

In the first state, the signal SFDB put out by the video controller 103 indicates that 16-bit transfers are permissible which, therefore, means that any access to the LOCAL VIDEO block 100 will occur via the first signal path. In approximately the time sequence in which they occur, the following events take place. First, at the end of each transaction, regardless of who initiated or the type of the transaction, an assumption is made that the next transaction will be a "local video"

access by the PROCESSOR block 80. Therefore, based upon this assumption, at the conclusion of each transaction, which is indicated when the signal BRDY* is asserted, the output signal LBUS* of the PAL PL2 is asserted LOW. In the address phase (i.e., the first clock period) of the next, now current, transaction, which is indicated by the PROCESSOR block 80 asserting the address strobe signal BADS* LOW, the PROCESSOR block 80 outputs valid address signals A[0]-A[23] and control signals W/R, D/C, M/IO. The local bus video access PAL PL1 decodes these signals and asserts the signal LOCAL* LOW because the address signals A[1-7]-A[23] are within the range of 0A0000 (hex) to 0BFFFF (hex) and the control signals W/R, D/C, M/IO are respectively asserted LOW, HIGH, and HIGH, indicating a read operation to memory (the term memory being used in the general sense and not necessarily referring to the SYSTEM MEMORY 10). The control signal LBUS* continues to be asserted LOW because the signal LOCAL* was asserted, which is an indication that the assumption made was correct.

The assertion of the signal LBUS* selects the first set of inputs 1A, 2A, 3A, and 4A of the multiplexers MX1-MX5 of the address multiplexer 121. In addition, the signal BADRE* asserted LOW by the PAL PL2 enables the outputs of the multiplexers MX1-MX4 (multiplexer MX5 is always enabled), causing the address multiplexer 121 to drive the address signals A[0]-A[15] onto the video bus 110 (i.e., DB[0]-DB[15]). The address signals A[16]-A[19] are simultaneously driven onto the extended video address bus.

The control signal VMEMR*, which is outputted by the PAL PL2, is asserted and applied to the video controller 103 indicating that a read operation is in progress. In response, the video controller 103 outputs and applies the direction control signal DIR to the transceivers BF1-BF2 enabling them to transfer data from the video bus 110 to the local data bus 41.

Beginning with the clock cycle subsequent to the address signals being driven onto the local address bus 42 by the PROCESSOR block 80, the PROCESSOR block 80 begins to wait for data to be returned from the LOCAL VIDEO block 100. Once the address signals A[0]-A[19] are driven onto the video bus and extended address bus to satisfy the video controller's address setup and hold times, the control signal BADRE* is negated thereby disabling the outputs of the multiplexers MX1-MX5 placing them in a high impedance state. Within a propagation delay time of the PAL PL2, the control signal LRDM* is outputted by the PAL PL2 enabling the outputs of the transceivers BF1 and BF2. Data from the video controller 103 is then driven onto the video bus 110 within 3 ns of the signal WAIT* being detected as not asserted. If the signal WAIT* is asserted the local video access is extended a corresponding amount. Data from the video bus 110 is then transferred to the local data bus 41, via the transceivers BF1 and BF2, to the PROCESSOR block 80.

Finally, the signal BRDY* is asserted by the PAL PL2 indicating to the PROCESSOR block 80 that the current transaction is completed.

In the second state, that is, a 16-bit write cycle, the events which transpire are similar to the first state except for those which are now discussed.

First, the control signal W/R outputted by the PROCESSOR block 80 is asserted HIGH and not LOW indicating a write operation. Next, the control signal VMEMW* is asserted by the PAL PL2 and applied to the video controller 103 indicating that a write operation is in progress. In response, the video controller 103 outputs the direction control signal DIR which is applied to the transceivers BF1-BF2 enabling them to transfer data from the local data bus 41 to the video bus 110.

Beginning with the clock cycle subsequent to the address signals being driven onto the local address bus 42 by the PROCESSOR block 80, the PROCESSOR block 80 begins driving data onto the local data bus 41. Once the address signals A[0]-A[19] are driven onto the video bus 110 and extended address bus to satisfy the setup and hold times of the video controller 103, the signal BADRE* is negated to place the multiplexers MX1-MX4 in a high impedance state. Next, the control signal LRDM* is outputted by the PAL PL2 enabling the outputs of the transceivers BF1 and BF2. Data from the PROCESSOR block 80 via the local data bus 41 is driven onto the video bus 110, via the transceivers BF1 and BF2, until the end of the local video access which is indicated by the absence of the signal WAIT*.

Finally, as with the 16-bit, read cycle, the signal BRDY* is asserted by the PAL PL2 indicating to the PROCESSOR block 80 that the current transaction is completed.

Turning now to the third and fourth states, the signal SFDB put out by the video controller 103 indicates that only 8-bit transfers are permissible, which, therefore, means that any access to the LOCAL VIDEO block 100 will occur via the second signal path. As before, in approximately the time sequence in which they occur, the following events take place.

First, at the end of each transaction, the assumption is again made, although incorrect in these latter two states, that the next transaction will be a "local video" access by the PROCESSOR block 80, that is via the first signal path. Therefore, the signal LBUS* is asserted LOW setting up for a "local video" access.

In the address phase of the current transaction, which is indicated by the PROCESSOR block 80 asserting the address strobe signal BADS* LOW, the PROCESSOR block 80 outputs valid address signals A[0]-A[23] and control signals W/R, D/C, M/IO. The local bus video access PAL PL1 decodes these signals but does not assert the signal LOCAL* because, even though the address signals A[17]-A[23] are within the range of 0A0000 (hex) to 0BFFFF (hex) and the control signals W/R, D/C, M/IO are respectively asserted LOW, HIGH, and HIGH indicating a read operation to memory, the signal SFDB is not asserted HIGH. Rather, the signal ADS* is asserted LOW which causes the I/O SYSTEM CONTROLLER 16 to effectively control the data transfer. In addition, the control signal LBUS* will be negated as soon as the signal LOCAL* is sampled and found not to be asserted by the PAL PL2. It is noted that even though the assumption was incorrect, system performance is not degraded as no time or clock periods are wasted.

The assertion of the signal ADS* by the PAL PL1 causes the I/O SYSTEM CONTROLLER 16 to first obtain control of the ISA bus 30, if for some reason it does not currently have control, which is an atypical but possible situation, and is indicated by the presence of the signals HOLD and HLDA. Once control is established, the address buffer 17 is enabled such that the address signals A[0]-A[23], which are driven onto the local address bus 42 by the PROCESSOR block 80, are transferred onto the ISA address bus 32.

Simultaneously, the negation of the signal LBUS* selects the second set of inputs 1B, 2B, 3B, and 4B of the multiplexers MX1-MX5 of the address multiplexer 121. The output signal BADRE* of the bus/line driver BF5 is asserted LOW by the video controller 103 via signal ADRE* when the read or write command signals SMEMR* and SMEMW* is received by the video controller. When asserted, the signal BADRE* from the output of the driver BF5 enables the outputs of the multiplexers MX1-MX4 (multiplexer MX5 being always enabled), thereby causing the address multiplexer 121 to drive the address signals SA[0]-SA[15] from the ISA address bus 32 onto the video bus 110 (i.e., DB[0]-DB[15]). The address signals SA[16]-SA[19] are simultaneously driven onto the extended video address bus via the multiplexer MX5. Once the address signals SA[0]-SA[19] are driven onto the video bus 110 and extended address bus to satisfy the address setup and hold times of the video controller 103, the multiplexers MX1-MX4 are disabled by negating the signal BADRE*.

The control signal VMEMR*, which is outputted by the driver BF5, is asserted and applied to the video controller 103 indicating that a read operation is in progress. In response, the video controller 103 outputs the direction control signal DIR, and at least one of the output enable signals BRDML* and BRDMH*, which are applied to the transceivers BF3-BF4, enabling data transfers from the video bus 110 to the ISA data bus 31. The HIGH byte enable signal VBHE* from the PAL PL1 is applied to the video controller 103 to indicate whether the high (or upper) byte is enabled.

Beginning with the clock cycle subsequent to the address signals being driven onto the local address bus 42 by the PROCESSOR block 80, the PROCESSOR block 80 waits for data to be returned from the LOCAL VIDEO block 100. Data from the video controller is eventually driven onto the video bus 110 within 3 ns of detecting that the signal WAIT* is not asserted. If the signal WAIT* is asserted, the cycle will be extended a corresponding amount. Data is then transferred from the video bus 110 to the ISA data bus 41 via at least one of the transceivers BF3 and BF4, which have been enabled by the appropriate signals BRDML* and BRDMH*.

It should be noted that the video controller 103 is impervious to the set of control signals applied thereto. That is, the video controller 103 cannot distinguish the type of access, whether it is a LOCAL VIDEO block access via the local bus 40 or ISA bus 30, because it cannot differentiate between which set of signals are being applied thereto. However, due to the invention, there is no need to differentiate between the two types of accesses.

While waiting for the data to be returned by the video controller, the I/O SYSTEM CONTROLLER 16 enables the data buffers 18 so that, when valid data is driven onto the ISA data bus 32 by the transceivers BF3 and BF4, the data buffer 18 is ready to transfer data from the ISA data bus 31 to the local data bus 42 and onto the PROCESSOR block 80.

Finally, the signal RDY* is asserted by the I/O SYSTEM CONTROLLER 16 indicating to the PROCESSOR block 80 that the current transaction is completed.

In the fourth state involving 8-bit write cycles, essentially the same sequence of events take place as in the 8-bit read cycle, except for those which are now described.

First, the control signal W/R outputted by the PROCESSOR block 80 is asserted HIGH and not LOW indicating that a write operation is about to be performed. Next, the control signal SMEMW* is asserted by the I/O SYSTEM CONTROLLER 16 so that the output VMEMW* of the driver BF5 is applied to the video controller 103 indicating that a write operation is in progress In response, the video controller 103 outputs the direction control signal DIR which is applied to and configures the transceivers BF3-BF4 to transfer data from the local data bus 41 to the video bus 110. The video controller 103 also outputs at least one of the signals RDML* and RDMH* which are respectively applied to the transceivers BF3 and BF4 via the driver BF5 outputs BRDML* and BRDMH*. Whether each of these signals RDML* and RDMH* are asserted depends on whether the high byte enable signal VBHE* is asserted.

Next, on the clock cycle subsequent to the address signals being driven onto the local address bus 42 by the PROCESSOR block 80, the PROCESSOR block 80 begins driving data onto the local data bus 41. Data is then driven onto the ISA data bus 31 via the data buffer 18, which was previously enabled by the I/O SYSTEM CONTROLLER 16. Data is then driven onto the ISA data bus 31 unless the signal WAIT* is asserted, in which case, the cycle is increased an appropriate amount. Next, the data is transferred from the ISA data bus 31 to the video bus 110 via the transceivers BF3 and BF4 where the data is then received by the video controller 103.

Assuming that the signal WAIT* is not asserted by the video controller 103, the signal BRDY* is asserted by the I/O SYSTEM CONTROLLER 16 indicating to the PROCESSOR block 80 via the driver BF5 that the current transaction is completed.

The foregoing description sets forth the construction of and the essential features of the PC system architecture in accordance with the present invention. The significance of and advantages therein become more apparent in view of TABLE 3 which illustrates the number of clock periods and wait states per cycle for each state.

TABLE 3

| STATE | NUMBER OF CLOCK PERIODS PER CYCLE | NUMBER OF WAIT STATES PER CYCLE |
| --- | --- | --- |
| LOCAL 16-bit, read and write cycle | 3 minimum | 1 minimum if cache FIFO full; 0 minimum if cache FIFO not full |
| ISA 8-bit, read and write cycles | 9 minimum | 7 minimum approximate |

TABLE 3-continued

| STATE | NUMBER OF CLOCK PERIODS PER CYCLE | NUMBER OF WAIT STATES PER CYCLE |
|---|---|---|
| (See Notes below) | | |

Notes:
1. Approximate cycles are dependent on the specific system controller used and the amount of time needed to synchronize the ISA Bus to the Local Bus.
2. A minimum ISA transfer is two cycles (8 MHz each) equaling 250ns.
3. Approximate synchronization delay is 1.5 (8 MHz) cycles which equals approximately 188 ns. At 20 MHz cycles (50 ns per cycle), 188 ns equals nine 20 MHz cycles which corresponds to seven wait states.

A particular advantage of the system architecture described herein is that the cache controller within the PROCESSOR block 80, which includes either an external cache such as the 82395 (or 82396) or a cache located within the microprocessor (e.g., 80486), can be used to its full potential. Therefore, in certain situations, the number of wait states for a data transfer can be effectively reduced to zero, as illustrated in TABLE 3. This is particularly true for write cycles because of a write buffer cache architecture (commonly referred to as the "post-write FIFO buffer") within the cache controller which allows the microprocessor to continue operation without waiting for write cycles to actually complete. That is, the cache controller indicates to the microprocessor that the write cycle has completed when, in fact, the cache controller has yet to actually complete the write cycle. The number of wait states can also be reduced to zero for read cycles as well, although read cycles transferring data to the LOCAL VIDEO block 100 would probably not be cached for reasons that are beyond the scope of this disclosure.

There has thus been shown and described a novel system architecture for a personal computer relating specifically to directly interfacing the video control circuitry with the processing unit to improve data transfers between the processing unit and video controller which fulfills all the objects and advantages sought therefor. Many changes, modifications, variations, and other uses and applications of the subject invention will, however, become apparent to those skilled in the art after considering the specification and the accompanying drawings which disclose preferred embodiments thereof. For instance, it would not be difficult to one skilled in the personal computer arts to realize that the PROCESSOR block 80 is not limited to the microprocessors and/or cache controllers specifically illustrated herein, nor would it be difficult to modify the LOCAL VIDEO block 100 to use a different type of video controller or video circuit such that a modified interface would be necessary between the video bus 110 and local bus 40 or ISA bus 30. All such changes, modifications, variations, and other uses and applications which do not depart from the spirit and scope of the invention are deemed to be covered by the invention, which is limited only by the claims which follow.

What is claimed is:

1. A personal computer comprising:
a local bus and a peripheral bus;
a first data path including said local bus and a second data path including said local bus and said peripheral bus;
processing means connected to said local bus for processing data;
interface means connected to said local bus and said peripheral bus for interfacing said processing means via said local bus to said peripheral bus; and
a video processor circuit, connected to said local bus and said peripheral bus, said video processor circuit including means for further processing data which is received from said processing means; and a display, connected to said video processor circuit, for displaying said further processed data, wherein data received by said video processor circuit from said processing means is transferred via one of said first and second data paths.

2. The personal computer as recited in claim 1, wherein said second data path further comprises said interface means.

3. The personal computer as recited in claim 1, further comprising control means responsive to outputs of said processing means and video processor circuit for selecting one of said two data paths for performing said data transfers.

4. The personal computer as recited in claim 1, further comprising a video bus, and wherein said video processor circuit further comprises video interface means connected to said local bus, said peripheral bus, and said video bus, for passing data from one of said local bus and peripheral bus to said video bus, and from said video bus to one of said local bus and said peripheral bus.

5. The personal computer as recited in claim 4, wherein said video interface means further comprises:
local data driving means for transferring data from said local bus to said video bus;
peripheral data driving means for transferring data from said peripheral bus to said video bus; and
address multiplexer means for transferring address information from one of said local bus and peripheral bus to said video bus.

6. The personal computer as recited in claim 5, wherein said local data driving means comprises tri-state transceivers.

7. The personal computer as recited in claim 5, wherein said peripheral data driving means comprises tri-state transceivers.

8. The personal computer as recited in claim 5, wherein said address multiplexer means comprises five quad two-input, tri-state multiplexers.

9. The personal computer as recited in claim 1, wherein said processing means comprises:
a microprocessor; and
a cache controller connected to and disposed between said microprocessor and said local bus.

10. The personal computer as recited in claim 1, wherein said processing means comprises a microprocessor connected to said local bus.

11. The personal computer as recited in claim 9, wherein said microprocessor is selected from the group consisting of 80486-architecture and 80386-architecture microprocessors.

12. The personal computer as recited in claim 10, wherein said microprocessor is selected from the group consisting of 80486-architecture and 80386-architecture microprocessors.

13. The personal computer as recited in claim 9, wherein said cache controller is selected from the group consisting of 82395-architecture and 82396-architecture cache controllers.

14. The personal computer as recited in claim 1, wherein said local bus comprises a local data bus and a local address bus, and said peripheral bus comprises a peripheral data bus and a peripheral address bus, and said interface means further comprises:
    address driving means for interfacing said local address bus to said peripheral address bus;
    data driving means for interfacing said local data bus to said peripheral data bus; and
    I/O system controller for controlling said address driving means and said data driving means.

15. The personal computer as recited in claim 1, wherein said local bus and peripheral bus respectively operate at first and second predetermined frequencies, said first predetermined frequency being greater than said second predetermined frequency.

16. A personal computer comprising:
    a local bus, a peripheral bus, and a video bus;
    a first data path comprising said local and video buses and a second data path comprising said local, peripheral, and video buses;
    processing means connected to said local bus for processing data;
    interface means for connecting said local bus to said peripheral bus;
    video interface means connected to said local bus, said peripheral bus, and said video bus for passing data from one of said local bus and said peripheral bus to said video bus; and
    video processor circuit, connected to said video bus, including means for further processing data which is received from said processing means; and a display for displaying said further processed data;
    wherein data transferred from said processing means to said video processor circuit traverses one of said first and second data paths.

17. The personal computer as recited in claim 16, further comprising means for transferring data from said video processor circuit to said processing means.

18. A personal computer comprising:
    a local bus, a peripheral bus, and a video bus;
    a first data path comprising said local and video buses and a second data path comprising said local, peripheral, and video buses,
    processing means connected to said local bus for processing data;
    interface means responsive to a first set of control signals for connecting said local bus to said peripheral bus;
    video interface means, connected to said local bus, said peripheral bus, and said video bus, and responsive to a second set of control signals, for passing data from one of said local bus and said peripheral bus to said video bus;
    video processor circuit connected to said video bus, including means for further processing data which is received from said processing means and a display for displaying said further processed data; and
    control means responsive to outputs of said processing means and video processor circuit for generating said first and second set of control signals so that data is transferred by said processing means to said video processor circuit via one of said first and second data paths.

19. The personal computer as recited in claim 18, further comprising means for transferring data from said video processor circuit to said processing means.

20. A personal computer comprising:
    a local bus operating at a first predetermined frequency;
    processing means, connected to said local bus and operating at a second predetermined frequency, for processing data; and
    video processor circuit including means for further processed data which is received from said processing means; and a display for displaying said further processed data, said video processor circuit being connected to said local bus such that data can be transferred from said processing means to said video processor circuit and from said video processor circuit to said processing means.

21. The personal computer as recited in claim 20, further comprising a peripheral bus operating at a third predetermined frequency which is less than said first predetermined frequency and means for connecting said processing means and said video processor circuit to said peripheral bus such that data can be transferred from said processing means to said video processor circuit and from said video processor circuit to said processing means over said peripheral bus.

22. The personal computer as recited in claim 21, wherein said first predetermined frequency equals said second predetermined frequency.

23. A personal computer comprising:
    a local bus, a peripheral bus, and a control bus;
    a first data path comprising said local bus and a second data path comprising said local and peripheral buses, said first and second data paths being responsive to a set of control signals;
    processing means connected to said local bus for processing data;
    interface means, responsive to said set of control signals and connected to said local bus and said peripheral bus, for interfacing said processing means via said local bus to said peripheral bus;
    video processor circuit, responsive to said set of control signals, including means for further processing data which is received from said processing means; and a display for displaying said further processed data, said video processor circuit being connected to said local bus and said peripheral bus such that data can be transferred between said processing means and said video processor circuit via one of said first and second data paths; and
    control means, responsive to outputs of said processing means and video processor circuit, for generating and outputting said set of control signals over said control bus to respectively enable said first and said second data paths.

24. The personal computer as recited in claim 23, wherein said control means further comprises:
    local control means, connected to said control bus and responsive to an enable signal, for generating said set of control signals to control data transfers over said first data path; and
    peripheral control means, connected to said control bus and responsive to said enable signal, for generating said set of control signals to control said data transfers over said second data path;
    wherein, only one of said local control means and peripheral control means is enabled at a time.

25. The personal computer as recited in claim 24, wherein said control means further comprises means for transferring data between said processing means and said video processor circuit via said first data path within a time period of three clock periods.

26. The personal computer as recited in claim 24, wherein each said clock period is not greater than 50 ns.

27. The personal computer as recited in claim 24, wherein said local control means comprises a programmable array logic integrated circuit.

28. The personal computer as recited in claim 24, wherein said peripheral control means comprises two bus/line drivers.

* * * * *